United States Patent [19]

Bourdonné

[11] Patent Number: 4,840,526

[45] Date of Patent: Jun. 20, 1989

[54] GRIPPING DEVICE FOR TENSIONING SCREWING ELEMENTS

[75] Inventor: Jean-Claude Bourdonné, Le Breuil, France

[73] Assignee: Framatome, Courbevoie, France

[21] Appl. No.: 39,125

[22] Filed: Apr. 16, 1987

[30] Foreign Application Priority Data

Apr. 17, 1986 [FR] France ................. 86 05552

[51] Int. Cl.[4] ............... F16B 39/28; F16B 39/30
[52] U.S. Cl. .................... 411/263; 411/307; 411/366; 411/426; 411/436
[58] Field of Search ............ 411/263, 307, 411, 414, 411/415, 426, 427, 366, 436; 285/334, 355

[56] References Cited

U.S. PATENT DOCUMENTS

| | | | |
|---|---|---|---|
| 3,079,181 | 2/1963 | Van der Wissel | 411/307 |
| 3,140,636 | 7/1964 | Grimm | 411/427 |
| 4,169,630 | 10/1979 | Wagner | 411/427 |
| 4,346,920 | 8/1982 | Dailey | 285/334 |
| 4,550,937 | 11/1985 | Duret | 285/355 |
| 4,571,135 | 2/1986 | Martin et al. | 411/427 |

Primary Examiner—Neill R. Wilson
Attorney, Agent, or Firm—Pollock, Vande Sande & Priddy

[57] ABSTRACT

A gripping device for tensioning a screwing element (2) which, at its free end, has an outer profile matching the inner profile of an engaging member (4). The screwing element (2) has an outer profile with teeth (20) of constant pitch and of constant cross-section, the mean diameter of which is generated by a truncated cone, and the engaging member (4) has an inner profile with teeth (40) of constant cross-section and of a constant pitch slightly greater than that of the screwing element (2) and generated on a conical bore of the same conicity as the outer profile (20) of the screwing element, the engaging member (4) being provided with a bearing zone (41c) which supports and transmits the forces and which is located on the peripheral part of the latter.

4 Claims, 2 Drawing Sheets

GRIPPING DEVICE FOR TENSIONING SCREWING ELEMENTS

The present invention relates to a gripping device for tensioning screwing elements of large dimensions in particular.

BACKGROUND OF THE INVENTION

In industrial installations using large-size screwng elements, during tightening and loosening operations a pull is exerted on the elements by means of a tensioning device, in order to keep them in a prestressed state.

This applies particularly to nuclear reactors, in which a cover is fastened removably on a vessel, to make it possible to reload the reactor periodically with fuel and inspect the interior of the vessel by means of this cover.

For this purpose, the cover is fastened on the reactor vessel by means of large-size volts which are screwed into the collar of the vessel and which penetrate into smooth holes provided in the collor of the cover. These volts are usually used in fairly large numbers and are relatively close to one another, with the result that, to remove and refit the cover, it is necessary to unscrew and screw all these volts and also tension them during each screwing and unscrewing operation.

This tensioning of the volts during each screwing and unscrewing operation is usually carried out by means of an assembly of jacks which exert a pulling force on each volt via an engaging piece consisting, for example, of a nut or a gripping jaw arranged on the free end of the volt.

There are various known devices, the common objective of which is to make it possible to ensure that the stress exerted on the threads is uniform and to balance the stress distribution.

FR-A-2,069,395 describes a thread system for a screw-type shut-off structure intended for high-pressure vessels, in which a threaded shut-off element is screwed into an associated threaded element of the vessel, at least one of these elements having a thread which has thread bottoms and associated clearances extending these. These clearances are directed radially from the inner ends of the thread bottoms and separate the continuous threads from one another, and the radial depth of these clearances in the direction of the thread end nearest to the vessel interior increases substantially parabolically.

However, the disadvantage of this known construction is that the thread-bottom clearances, because they vary according to a parabolic curve, weaken the screw in its section which has tensile strength.

FR-A-2,427,881 also discloses a tightening device, the main feature of which is that the engagement profile consists, over the upper half of its height, of teeth having a constant pitch and a constant groove-bottom diameter, the succeeding teeth having a staggered pitch and groove diameter.

Consequently, it appears difficult to achieve uniform distribution of the pulling force over the teeth, and moreover the machining of a variable pitch with a changing profile is very costly.

SUMMARY OF THE INVENTION

The object of the present invention is, therefore, to provide a device which is of simple design and is easy to use and which, when the screwing element is tensioned, improves the distribution of the forces exerted in the assembly as a whole.

According to the invention, a gripping device for tensioning a screwing element which, at its free end, has an outer profile matching the inner profile of and engaging member is characterized in that the screwing element has an outer profile with teeth of constant pitch and of constant cross-section, the means diameter of which is generated by a truncated cone, and in that the engaging member has a profile with teeth of constant cross-section and of a constant pitch slightly greater than that of the screwing element and generated on a conical bore of the same conicity as the outer profile of the said screwing element, the said engaging member being provided with a bearing zone which supports and transmits the forces and which is located on the peripheral part of the latter.

BRIEF DESCRIPTION OF THE DRAWINGS

In order that the invention may be more clearly understood, two embodiments of the device according to the invention will now be described with reference to the accompanying drawings, in which.

DESCRIPTION OF PREFERRED EMBODIMENT

Figures 1, 1A:
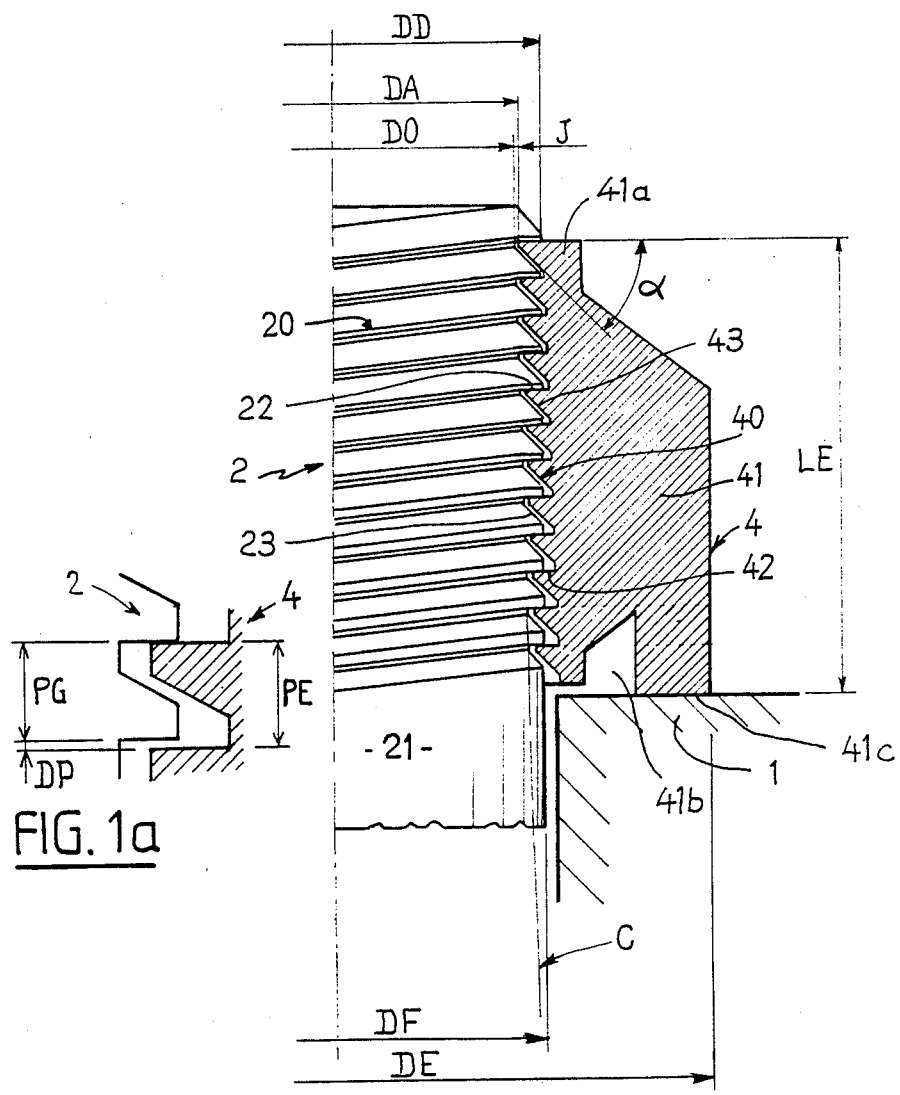
FIG. 1 is a plan half-view of the helical-thread screw/nut device according to the invention.
FIG. 1a is a view on a larger scale of a thread of the screw/nut device.

FIG. 1 shows a gripping device for tensioning a screwing element formed by a volt 2, the free end of which is provided on the outside with a helical thread 20. Screwed onto the thread 20 of the volt 2 is an engaging member consisting of a nut 4 which has an internal helical thread 40.

The nut 4 rests on a piece forming a bearing and consisting of a jack of a system for tensioning the pin 2.

This nut 4 makes it possible to transfer the pulling force exerted by the piece 1 onto the body 21 of the volt 2 via its gripping end and via the nut 4 by means of the "N" threads in the most uniform way possible.

To achieve this, the nut 4 consists of a cylindrical body 41 of outside diameter DE, having at its upper end a thinner part 41a connected to the body 41 by means of a truncated cone. On the other hand, the body 41 of the nut 4 also has at its lower end a thinner part formed by an annular groove 41b joined to the said body 41 by means of a sloping or rounded bottom. This lower end defines a slightly projecting reference bearing surface 41c for the system tensioning the volt 2.

The thread 20 provided at the free end of the volt 2 to be tensioned is generated by a truncated cone of small diameter of the vertex DO and of conicity C.

The profile of the thread 20 is trapezoidal, and the bearing face 22 of the said thread is formed from a generatrix perpendicular to the axis of volt 2, describing a helical surface of pitch PG and bearing on the base cone of a diameter at the vertex DO and of conicity C.

The upper face 23 of the thread 20 is formed by means of a generatrix inclined at an angle α relative to the axis of volt 2, and it bears on the cone of diameter DO and of conicity C. This face 23 of the thread 20 also describes a helical surface of pitch PG.

The vertex of the thread 20 generated in this way is truncated by a cylinder of diameter DF equal to the diameter of the body 21 of volt 2, in order to increase the bending of the threads of the nut 4.

The thread 40 of the gripping nut 4 screwed onto the end of volt 2 is generated on a truncated cone of small diameter of the vertex DA and of conicity C, so that DA is greater than DO. The profile of the thread 40 is trapezoidal, and the bearing face 42 of the said thread describes a helical surface of pitch PE bearing on the base cone of a diameter of the vertex DA and of conicity C.

The lower face 43 of the thread 40 is formed by means of a generatrix inclined at one and the same angle $\alpha$, and it bears on the cone of diameter DA and of conicity C. This face 43 also describes a helical surface of pitch PE.

A functional play J is provided between the thread 20 of volt 2 and the thread 40 of the nut 4, to allow the latter to be screwed and to tolerate an inaccuracy in the position of the nut relative to volt amounting to at most one revolution.

The difference DP (FIG. 1a) between the pitch PE of the thread 40 of the nut 4 and the pitch PG of the thread 20 of volt 2, so that $DP=PE-PG$, is determined as a function of the geometry of the system and the desired distribution of the forces over the bearing threads and the stresses.

The diameter DA of the vertex of the "bore" truncated cone of the nut 4 is determined as a function of the play J and the difference in position of one revolution, and the diameter DD of the vertex of the thread-bottom truncated cone of the nut 4 is determined as a function of the pitch PE and of the play J between threads.

The length LE of the nut 4 is a function of the force to be distributed and therefore of the number of threads "N" engaged, i.e., $LE=N\times PG$.

Figures 2, 2A:
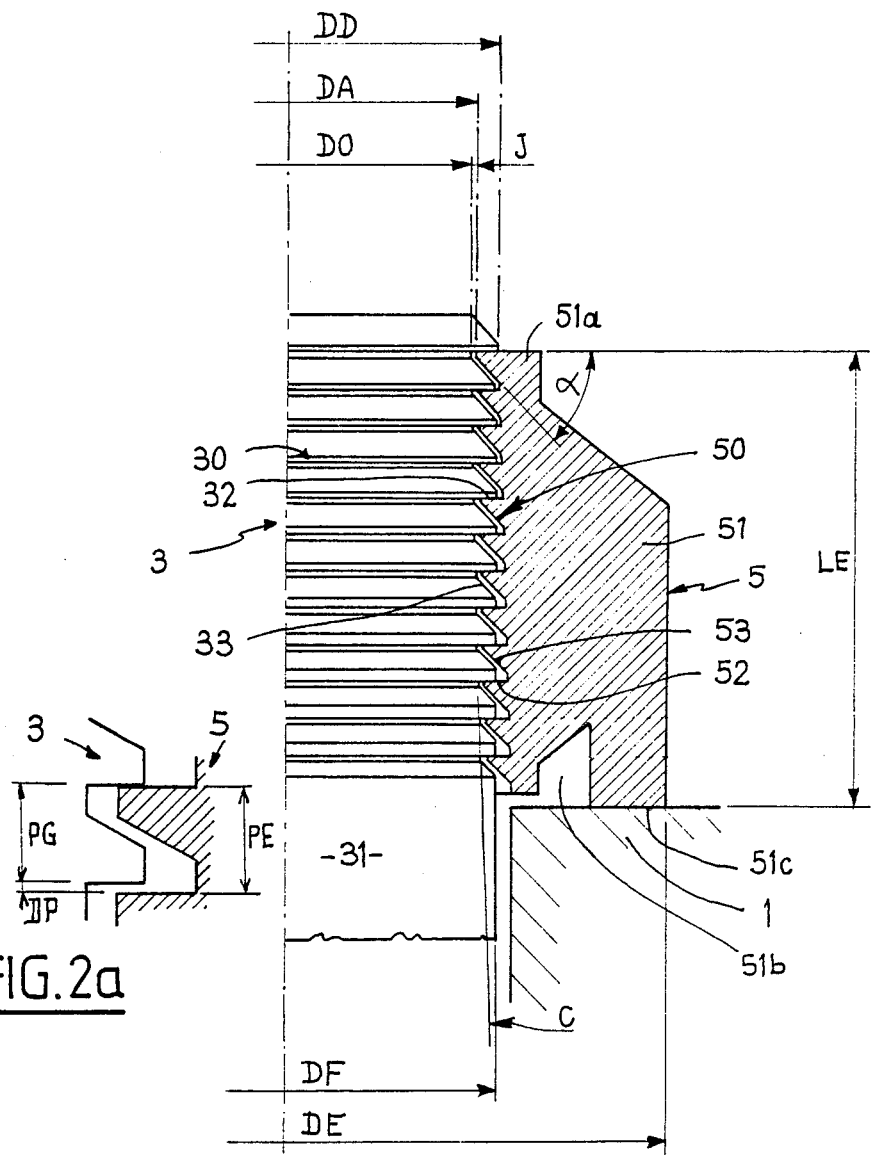
FIG. 2 is a plan half-view of a device according to the invention with splines and a jaw.
FIG. 2a is a view on a larger scale of a spline of the device with splines and a jaw.

With regard to a device with splines and a jaw, as shown in FIG. 2, the free end of the volt 3 to be tensioned is provided on the outside with splines 30 generated on a truncated cone of a small diameter at the vertex DO and of conicity C.

The profile of the spline 30 of pitch PG is trapezoidal, and the bearing face of each spline of the volt 3 is formed from a generatrix perpendicular to the axis of the said volt, describing a plane and bearing on the cone of small diameter of the vertex DO and of conicity C.

The upper face 33 of each spline 30 is formed by means of a generatrix inclined at an angle $\alpha$ relative to the axis of the volt 3, and it bears on the cone of diameter DO and of conicity C. This face 33 thus describes a truncated cone of an axis in common with that of the volt 3, in order to increase the bending of the splines of the jaw.

The vertex of the splines 30 generated in this way is truncated by a cylinder of diameter DF equal to the diameter of the body 31 of the volt 3.

The gripping jaw 5 which grips the splined end of the volt 3 is in several parts and, as with the nut 4 of the preceeding example, has at its upper end a thinner part 51a joined to the body 51 of the said jaw by means of a truncated cone. On the other hand, the jaw 5 also has at its lower end a thinner part formed by an annular groove 51b joined to the body 51 by means of a sloping or rounded bottom. This lower end defines a slightly projecting reference bearing surface 51c for the system tensioning the volt 3.

The gripping jaw 5 of outside diameter DE is equipped internally with splines 50 generated by a truncated cone of small diameter at the vertex DA and of conicity C, so that DA is greater than DO. The pitch PE of the splines 50 of the jaw 5 is different from the pitch PG of the volt 3, to ensure that $PE>PG$.

The profile of the splines 50 is trapezoidal, and a bearing face 52 of the said splines is generated in an identical way to the bearing face 32 of the splines 30 of the volt 3. The same is true of the lower face 53 of the splines 50 which is generated with the same angle $\alpha$ and in an identical way to the upper face 33 of the splines 30 of the volt 3.

A functional play J is provided between the splines 30 of the volt 3 and the splines 50 of the jaw 5, to make it possible to fit the latter and to tolerate an inaccuracy in the position of the jaw relative to the pin amounting to one spline, hence one pitch.

The difference DP (FIG. 2a) between the pitch PE of the splines 50 of the jaw 5 and the pitch PG of the splines 30 of the volt 3, so that $DP=PE-PG$, is determined as a function of the geometry of the system, the desired distribution of the forces over the bearing splines and the stresses.

The diameter DA of the vertex of the "bore" truncated cone of the jaw 5 is determined as a function of the play J and the difference in position of one revolution, and the diameter DD of the vertex of the groove-bottom truncated cone of the splines 50 of the jaw 5 is determined as a function of the pitch PE and the play J between splines.

The length LE of the jaw is a function of the force to be distributed and therefore of the number of splines "N" engaged, i.e., $LE=N\times PG$.

The shape of the engaging member consisting of the nut 4 or the jaw 5 makes it possible to transfer the pulling force exerted on the body of the volt via its gripping end and via the same engaging member by means of the "N" threads or splines in the most uniform way possible. Since the tensioning of the volt 2 or 3 is carried out progressively by the jack 1 provided for this purpose, it is the thread or the spline located in the upper part of the gripping device which first undergoes the pulling force which at this moment is of a low value, and then, in proportion to the degree of tensioning, each thread or spline absorbs some of the force in succession from the upper part to the lower part. At the end of tensioning, the pulling force is distributed practically uniformly, any variation around the uniform distribution being attributable to the production tolerances of the respective pitches of the volt 2 or 3 and of the nut 4 or jaw 5.

The thinning of the ends of the engaging member 4 or 5 makes it easier for the threads or splines located in these zones to bend, this being linked to the difference in pitch between the volt and the engaging member, thus improving the distribution of the forces as a result of the interdependence of the volt and the engaging member.

Because the bearing action is shifted to the periphery of the nut 4 or the jaw 5, it is possible to avoid influencing the threads or splines located in the lower part of the nut or jaw by bearing forces causing undesirable bending and shearing which impedes the free deformation of these threads or splines.

The bearing section of the nut or jaw is sufficient to ensure that the system operates effectively, because the mean bruising stress is limited to a value clearly below the elastic limit.

This device, which is of simple design and is easy to use, has many advantages.

First of all, it makes it possible to have a maximum core section of the volt in the zone on the pulling forces and, consequently, a smaller diameter of the volt body with equal core-bottom stresses. Moreover, a uniform distribution of the pulling force on the threads or splines is obtained, by utilizing the greater bending of the last threads of the nut or the last splines of the jaw, and by acting on the difference in pitch between the thread of the volt and that of the nut or between the splines of the volt and those of the jaw.

Moreover, this device makes it possible to avoid very costly machining, such as that required by systems with a variable pitch or with a changing profile, or by systems with threads or splines generated on the surface of revolution which is neither cylindrical nor conical.

Finally, the screw/nut assembly tolerates an inaccuracy in the position of the nut relative to the volt ranging from zero to one pitch, and the spline/jaw assembly tolerates a difference in position of one pitch.

The device according to the invention is used not only in nuclear power stations, but also in petroleum and petrochemical installations, in mining installations or for closing turbines, hydraulic valves, pressurized pipelines or valve bodies. In general, the device according to the invention is used in many industrial installations which employ large-size screwing elements.

What is claimed is:

1. Gripping device for tensioning a screwing element (2,3) having a free end, said free end having an outer profile (20,30) complementary to an inner profile (40, 50) of an engaging member (4, 5), said outer profile comprising teeth of constant pitch whose mean diameter is generated by a truncated cone and a generatrix of whose outer diameter is parallel to the axis of said screwing element (2, 3), said inner profile (40, 50) comprising teeth of constant cross-section and of a constant pitch slightly larger than that of said screwing element (2, 3) and generated on a conical bore of the same conicity as said mean diameter of said outer profile (20, 30) of said screwing element, said engaging member being provided with a bearing zone (41c, 51c) which supports and transmits forces and which is located on a peripheral portion of said engaging member.

2. Device according to claim 1, wherein said outer profile (20, 30) of said screwing element (2, 3) and said inner profile (40, 50) of said engaging member (4, 5) are generated by a helix.

3. Device according to claim 1, wherein said outer profile (20, 30) of said screwing element (2, 3) and said inner profile (40, 50) of said engaging member (4, 5) are formed by cylindrical channels.

4. Device according to claim 1, wherein said bearing zone (41c, 51c) of said engaging member (4, 5) is delimited by an annular groove (41b, 51b) located inwardly of an outer profile of said engaging member and having a sloping or rounded bottom.

* * * * *